Figure 1:
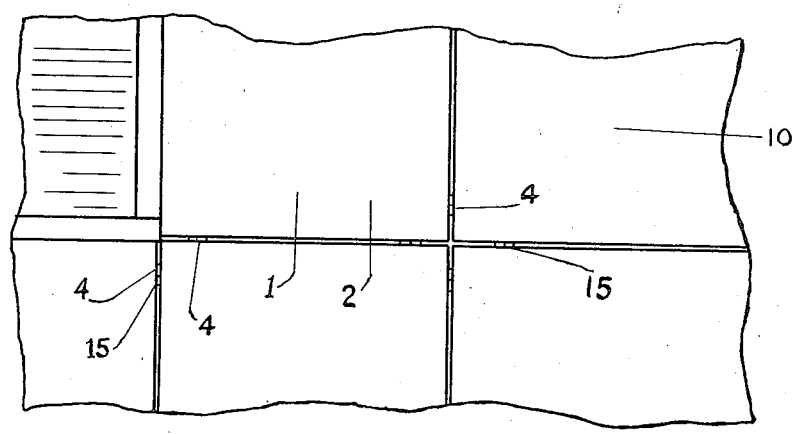

Dec. 5, 1939.    J. H. MARKOWSKI    2,182,523
STRUCTURAL ELEMENT AND CONNECTOR
Filed Dec. 22, 1937    2 Sheets-Sheet 1

Inventor
Joseph H. Markowski
By  [signature]
    Attorney

Dec. 5, 1939.  J. H. MARKOWSKI  2,182,523
STRUCTURAL ELEMENT AND CONNECTOR
Filed Dec. 22, 1937  2 Sheets-Sheet 2
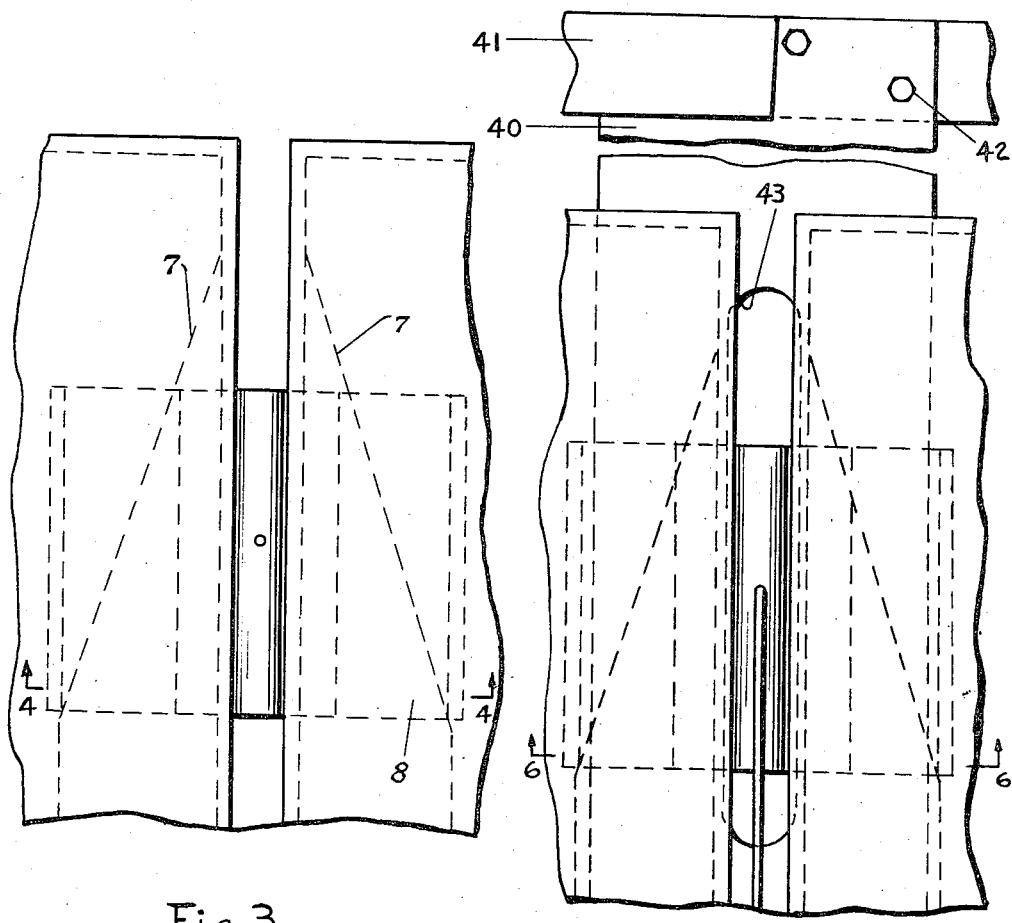
Fig. 3
Fig. 5
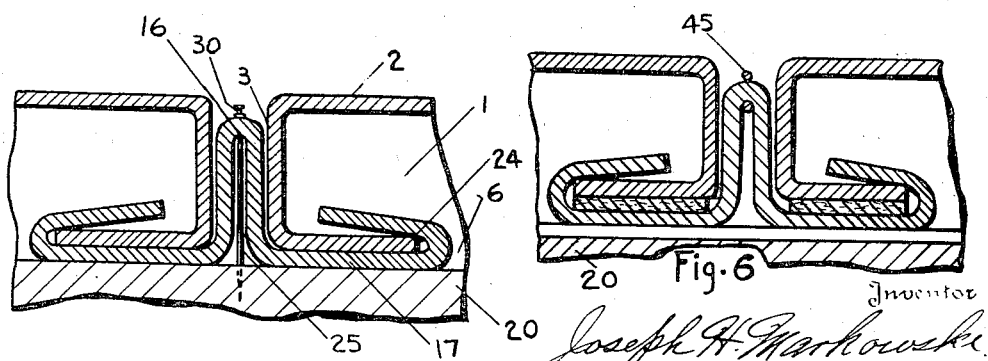
Fig. 4
Fig. 6
Inventor
Joseph H. Markowski
By Faust F. Crampton
Attorney Patented Dec. 5, 1939

2,182,523

UNITED STATES PATENT OFFICE 2,182,523

STRUCTURE ELEMENT AND CONNECTOR

Joseph H. Markowski, Toledo, Ohio

Application December 22, 1937, Serial No. 181,202

5 Claims. (Cl. 189—88)

My invention relates generally to the art of structure fabrication. The invention particularly relates to structural construction wherein a plurality of structural elements, such as plaques, planiform sections or panels, which, according to the purpose to which the elements are to be put, may or may not be flexible or moldable to a degree, are utilized to form the structure or component parts thereof.

My invention has for an object to provide means for supporting each of a plurality of structural elements in a desired position and relation to form a structure. Another object of my invention is to provide a means for locking each of said elements in said desired position and relation. Still another object of the invention is to provide means for supporting and interlocking a plurality of said elements in a desired position and relation, said means being of such construction and so related to said elements that any one or more elements may be removed from said position and relation without altering the position and relation of the other elements notwithstanding said interlocking.

A further object of my invention is to provide, in connection with an element of some pliability or moldability, a means for supporting and maintaining the defining surfaces of such an element in any desired plane or planes. Further, said invention provides means whereby each of a plurality of elements may be supported in desired related planes despite a differential in the degree of flexibility and/or moldability between each of said plurality of elements.

A still further object of the invention, in connection with structural elements, which may, by reason of their disposition, be subjected to extreme changes in temperature or moisture with resulting contraction and expansion or to vibrations by reason of surrounding agitation, is to provide a means for mounting said element which, while yieldably resisting, permits, without surrendering its supporting and positioning control, a certain latitude of movement of the said element compensatory to said contraction, expansion or vibration of the structural element body.

A particular object of the invention is to provide a structural panel and fastening means therefor partaking of one or more of the features referred to above and producible and installable at costs markedly lower than those of the panels and fastening means of the prior art.

The invention consists in other features and advantages which will appear from the following description and upon examination of the drawings. Structures containing the invention may partake of different forms and still embody the invention. To illustrate a practical application of the invention, I have selected a structural element and connector as an example of the various structures and details thereof that contain the invention and shall describe the selected structure hereinafter, it being understood that variation may be made without departing from the spirit of the invention. The particular structure selected is shown in the accompanying drawings and described hereinafter.

Figure 2:
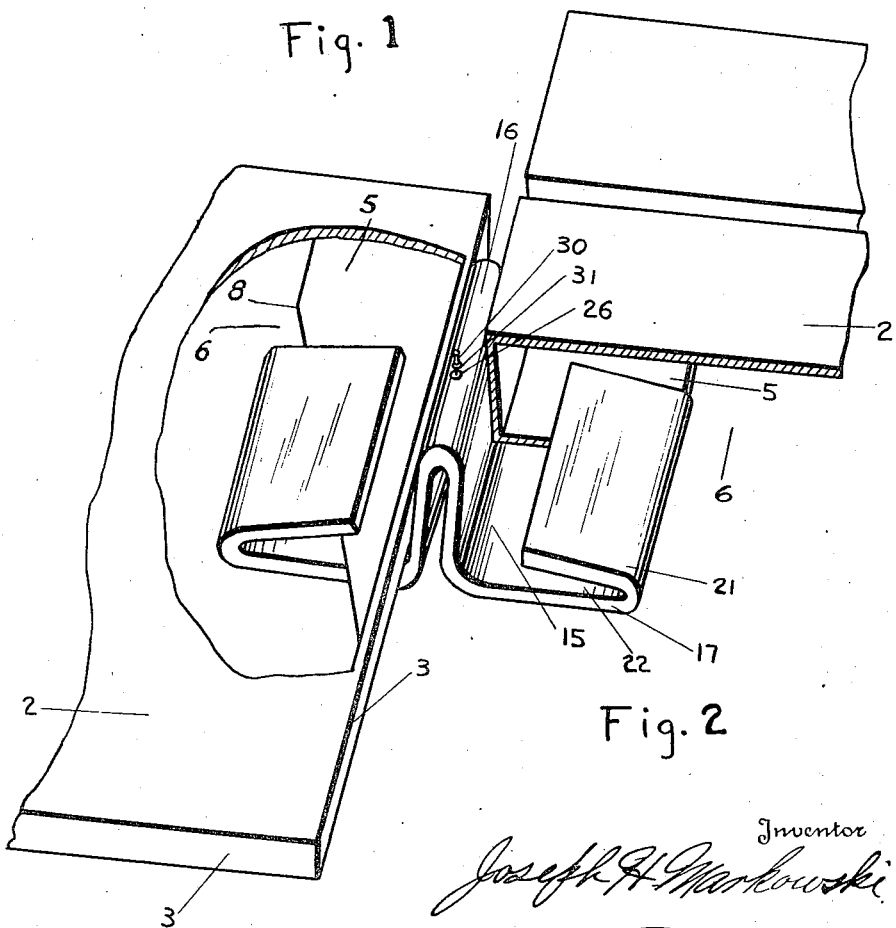

Fig. 1 of the accompanying drawings illustrates a perspective view of a part of a building structure showing structural elements and connector means therefor, embodying the features of my invention, supported in installed relation on said structure. Fig. 2 illustrates an enlarged perspective view of parts of the adjacent elements and a connector shown in Fig. 1, parts of the elements being shown broken away to facilitate disclosure. Fig. 3 illustrates an enlarged plan view of adjacent elements and connector means therefor. Fig. 4 illustrates a view of a section taken along the plane of the line 4—4 indicated in Fig. 3. Fig. 5 illustrates a plan view of adjacent elements and connector means mounted in a different manner than that shown in Figs. 1 and 4. Fig. 6 illustrates a view of a section taken along the plane of the line 6—6 indicated in Fig. 5.

In the particular construction selected to illustrate an embodiment of my invention, a structural element, such as the panel 1, has a face surface 2. The panel may be formed by bending a sheet of metal to form said face surface 2 and thereto adjoining edge surfaces 3. If desired, the face and edge surfaces may be decorated, such as by enameling or vitrifying, or the metal defining said surfaces may confine materials, such as thermal, electrical or sonic insulators. It is further within the contemplation of my invention that said face surface may be cut away in part to expose such material as is confined within the metal forming the partial face surface resulting from said cutting away and said edge surfaces. The said face and edge metal forms a furring frame for supporting the exposed material in that event and bears the major strain of forces that may be set up in the material. In this connection and event, a back or supplementary plate oppositely disposed to the metal forming the face surface 2 may be found desirable and be provided on the panel 1.

Extending from the panel 1 is a tongue or flange 5. The tongue flange 5, preferably, extends in a plane angular to the plane of the edge surface 3. In the form shown in the accompanying drawings, the tongue flange 5 extends at right angles to the plane of the edge surface 3 and inwardly with respect thereto forming a partial backing plate to the metal of the face surface 2. Preferably, a plurality of tongue flanges 5 are provided on each panel 1 and are located at spaced points 4 indicated on Fig. 1 of the drawings. In that sense, the tongue flange 5 forms one side edge of a slot or recess 6 extending into the space defined by the bent portions of the metal panel 1.

The panel 1 is provided with a cam portion which diverges from a point on a plane parallel to the plane of the edge surface 3 and forms a component part in the interlocking of adjacent panels, as will be described hereinafter. In the particular embodiment illustrated herein, said cam portion may be formed on said tongue 5 by the edge 7. It will be noted that the cam edge originates at and diverges from a point on a plane parallel to the plane of the edge surface 3 to the cam high point 8 located in a plane parallel to the plane of the edge surface 3 and spaced from the plane of cam origination. A connector means is provided cooperating with said edge surface 3, said tongue flange 5 and cam portion 7 to enable supporting each of a plurality of panels 1 in related adjacency whereby a structure, such as the building wall 10, illustrated in Fig. 1, may be fabricated.

Said connector means includes a spine portion and a leg portion. The spine portion bears the pressures exerted in associating the connector means to element panel 1. The leg portion extends from said spine portion and acts to produce the connecting bearing pressures and also to frictionally seize upon the tongue flange. The spine portion not only cooperates with the leg portion in supporting the said connecting bearing forces, but also cooperates with the leg portion in its seizure of the tongue flange to determine the plane or planes in which the face surface 2 is to extend, all of which will be more thoroughly understood hereinafter.

For the purposes of illustrating an embodiment of the connector means above referred to, I have selected the member 15. The member 15 may be shaped from sheet metal to form a spine portion 16 and a leg portion 17. Preferably, the metal is bent upon itself to form a spine portion 16, which, when viewed endwise in the preferred position of installation shown in Fig. 4, has the appearance of an inverted U, one depending part being connected to a leg portion 17 and the other depending part being connected to a second and like leg portion 17.

Each leg portion 17 extends from the spine portion as to be disposed at an angle, which is determined by the particular plane in which it is desired to locate the face surface 2 of the associated panel. In the particular structure illustrated, it is desired that the surface 2 extend in a plane parallel to the surface plane of the backing member 20 of the wall 10 and, thus, the leg portion 17 extends at right angles to the spine portion 16. If it is desired to produce a pitch to said surface 2, the angle between the spine 16 and leg portion 17 engaging, as hereinafter described, the panel, to which a pitch is desired to be imparted, may be increased or decreased depending on the direction the pitch is desired. Each leg portion 17 is provided with a means reactive against the cam portion 7.

Said last-named means may be embodied in a foot part 21 which may be formed by giving the end of the leg portion 17 a return bend which, when viewed endwise as in Fig. 4, has the appearance of a V disposed on its side of which the leg portion 17 is one side and the foot part 21 is the other, the open end extending toward the spine portion 16. The relation of the foot part and leg portion may be further described as defining a V-shaped groove 22. Thus, in the course of movement of the member 15 relative to a panel 1 toward an installing position with reference thereto, such as is substantially illustrated in Fig. 2 of the drawings, the spine portion 16 slidably engages the edge surface 3 of the panel 1, the leg portion 17 slidably engages one side of the tongue flange 5 and the foot part 21 extends over the other or top side of the tongue flange 5 locating the said tongue flange within the groove 22. As the relative movement of the member 15 and panel 1 continues, the said other or top side of the tongue flange 5 is engaged by the foot part 21, to seize and pinch the tongue flange in said groove 22 and between said foot part and leg portion, as indicated at 24 on Fig. 4 of the drawings. The action of seizure and pinching of the tongue flange 5 at this point serves to apply a leverage on the tongue flange about a fulcrum point substantially located at the point of interjointure of the spine and leg portions of the member 15 which produces, through the metal forming the edge surface 3, a desired apportionment of the surface 2 in a plane determined by the angular relation that the leg and spine portions bear to each other. Coincident with said action of seizure and pinching of the tongue flange 5, the foot part 21 engages the cam portion 7 operating to force the spine portion and edge surface 3 into snug bearing relation, as the member, in moving, approaches the high point 8 of the cam 7. The force thereby exerted assures interconnection between the panel 1 and member 15 and also assists in the aforesaid apportioning of the face surface 2. Now, therefore, if the member 15 is fixed at this stage, such as to the backing 20, the panel 1 will be supported. Such a fixing means as the nail 25 may be provided for this purpose and may extend through an eye 26 performed in the spine portion 16 and be driven into the backing 20.

Where a plurality of panels 1 are to be utilized, as in fabricating the wall 10, each adjacent panel is located so that the tongue 5, cam portion 7 and high point 8 thereof are in aligning registration, as shown in Fig. 3 of the drawings. The member 15 is then inserted between the adjoining edge surfaces 3 of the adjacent panels so that the spine portion 16 extends between the edge surfaces 3 and the leg portions extend inwardly with respect to said edge surfaces. Preferably, the member 15 is moved relative to the panels 1 to approach the two diverging cam portions 7 and moving into the locking position with regard to each panel as heretofore described. The nail 25 may then be driven into the backing 20 to maintain the relation of the adjoined panels to said backing.

If desired, the nail may be provided with seizable extension 30 extending from the head 31 thereof, by means of which the nail may be easily withdrawn. This may be done, while operating on the face side of the panels when it is desired to remove one of a plurality of already assembled panels without disturbing the remaining mounted panels or the backing 20. On removal of the nail 25, the member 15 may be slidingly moved with reference to the panel as to release the tongue flange 5 of the panel whose removal is sought permitting the same and reassembly with the same or another like panel in the same manner, as heretofore described.

It will be further marked that the depending legs of the spine portion 16 possess some resiliency, both by reason of the nature of the material from which the member 15 is formed and the characteristic yieldable bend given to said spine portion in forming. The said resiliency permits slight but sufficient movements of the panel edges with respect to each other and the fixing nail 25 to accommodate for movement in the panel body due to thermal contraction and expansion or to vibration. The member 15, while accommodating for such exigencies, does not, in the coping therewith, relinquish control over the panel.

In Figs. 5 and 6 the panels 1 and member 15 are illustrated mounted in a manner different from that heretofore described. It is contemplated that it may be desirable to construct a wall 10 in places where a backing 20 is either not found, is spaced from said place or where the backing is resistant to receiving the fixing means. In such event, it is suggested that a hanger 40 be provided and be attached to a cross bar 41, as by bolts 42. The hanger 40 has a slot 43 through which the spine portion 16 of the member 15 extends and along which it is slidably movable. The leg portions 17 are located so that not only the tongue flange but also the portions of the hanger 40 adjacent the slot 43 are received in the groove 22, as illustrated in Fig. 6 of the drawings. It will be noted that when the member 15 has been moved to panel-locking position, the hanger 40 and the tongue 5 are both seized and pinched between the leg portions and foot part of the member 15.

In order to lock the member 15 in position on the hanger 40, some suitable fixing means may be provided. Preferably, a wire cable 45 is threaded through the eye 26 and may be fixed to some fixed part or to another like member 15 to thus maintain the respective members in locking position, subject, however, to removal, as heretofore described.

While in accordance with the provisions of the statutes, I have illustrated and described the best form of my invention now known to me, those skilled in the art will readily understand that many changes may be made in the form of construction disclosed, without departing from the spirit of my invention as set forth in the appended claims.

I claim:

1. A structural element having a face surface, an edge surface adjoining said face surface and extending in angular relation thereto, a tongue formed on said element and extending from said edge surface, the tongue having a cam edge, a connecting means for said element including a member movable with reference to said element and having a spine portion, a leg portion extending from said spine portion in angular relation thereto, a foot part formed on the leg portion and defining a groove between the leg portion and foot part adapted to receive the tongue therein to seize the same, said foot part engaging said cam part to urge the spine portion into substantially snug engagement with the said edge surface.

2. A structure comprising a plurality of adjacently disposed structural elements, each of said elements having a face surface and a second surface adjoining said face surface and extending in angular relation thereto, a tongue formed on said element extending in angular relation to said second surface, said tongue having a cam edge originating at a point on a plane parallel to the plane of said second surface and diverging therefrom to a point on a parallel plane spaced from the originating plane, each structural element disposed so that the tongue and cam edge thereof is adjacent a corresponding tongue and cam portion of an adjacent element, a connecting means for said adjacent elements including a member having a spine and a pair of leg portions, the spine portion located in angular relation to each of said leg portions, means on each of said leg portions for seizing the tongue of one element, a second means on said leg portion for engaging the cam portion of one element whereby the elements will be urged towards each other to locate the second surface of each panel in substantially snug relation with the spine portion, and means for fixing said connecting means in said position.

3. A structure comprising a plurality of adjacently disposed elements, one of said elements having a high-point cam portion, means movable with reference to said cam portion and engaging the cam portion and another of said elements to draw the said first element toward the other element with a pressure which increases as the means approaches the high point of the cam portion, said means including a resilient part disposed between the points of engagement of said means with said elements and tending to resiliently maintain the engaged elements against relative movements away from each other notwithstanding the pressure exerted by said cam portion to accommodate for undeterminable forces exerted by or on one of the elements engaged by said means induced by vibration of or thermal change in the body of the said elements.

4. A structure comprising a plurality of adjacently disposed elements, each of said elements having a face surface and a back surface, one of said elements having a high-point cam portion extending from the back surface, means movable with reference to said cam portion and engaging the said cam portion and the back surface of another of said elements to draw the said elements toward each other with a pressure which increases as the means approaches the high point of the cam portion, and said means including a part extending between the said engaged elements outwardly from the back surface and toward the front surface of said elements as to be accessible from the front surfaces of the engaged elements for desired and directed movement of the said means.

5. A structure comprising a plurality of adjacently disposed elements, each of said elements having a face surface and a back surface, one of said elements having a high-point cam portion extending from the back surface, means movable with reference to said cam portion and engaging the said cam portion and the back surface of another of said elements to draw the first element toward the other element with a pressure which increases as the means approaches the high point of the cam portion, and said means having a part extending between said engaged elements outwardly from the back surfaces toward the front surfaces of said engaged elements and against which the first-named element is urged to bear as the means approaches the high point of the cam portion, said part being readily accessible from the front surfaces of said elements for desired and directed movement of said means relative to the cam portion to release the first element.

JOSEPH H. MARKOWSKI.